(12) United States Patent
Tan et al.

(10) Patent No.: US 9,330,600 B2
(45) Date of Patent: May 3, 2016

(54) ACTIVE MATRIX ORGANIC LIGHT-EMITTING DIODE PIXEL CIRCUIT HAVING A TOUCH CONTROL MODULE AND METHOD FOR DRIVING THE SAME

(71) Applicants: CHENGDU BOE OPTOELECTRONICS TECHNOLOGY CO., LTD., Chengdu, Sichuan (CN); BOE TECHNOLOGY GROUP CO., LTD., Beijing (CN)

(72) Inventors: Wen Tan, Beijing (CN); Xiaojing Qi, Beijing (CN)

(73) Assignees: CHENGDU BOE OPTOELECTRONICS TECHNOLOGY CO., LTD., Chengdu, Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 111 days.

(21) Appl. No.: 14/348,296

(22) PCT Filed: Sep. 29, 2013

(86) PCT No.: PCT/CN2013/084630
§ 371 (c)(1),
(2) Date: Mar. 28, 2014

(87) PCT Pub. No.: WO2014/205944
PCT Pub. Date: Dec. 31, 2014

(65) Prior Publication Data
US 2015/0002432 A1  Jan. 1, 2015

(30) Foreign Application Priority Data

Jun. 26, 2013  (CN) .......................... 2013 1 0259983

(51) Int. Cl.
*G06F 3/041* (2006.01)
*G09G 3/32* (2016.01)

(52) U.S. Cl.
CPC .............. *G09G 3/3258* (2013.01); *G06F 3/041* (2013.01); *G09G 3/3233* (2013.01);
(Continued)

(58) Field of Classification Search
CPC ....................................................... G06F 3/041
USPC ................................................. 345/173, 175
See application file for complete search history.

(56) References Cited

U.S. PATENT DOCUMENTS

2002/0079512 A1* 6/2002 Yamazaki ........... G06F 3/03545
257/200
2005/0099372 A1  5/2005 Nakamura et al.
(Continued)

FOREIGN PATENT DOCUMENTS

CN  101017491 A  8/2007
CN  102402931 A  4/2012
(Continued)

OTHER PUBLICATIONS

First Office Action (Chinese language) issued by State Intellectual Property Office of People's Republic of China, in Chinese application No. 201310259983.6, dated Nov. 3, 2014, 6 pages.
(Continued)

*Primary Examiner* — Long D Pham

(57) ABSTRACT

The present disclosure relates to a field of display technology, and provides an AMOLED pixel circuit, a method for driving the same, and a display device, which can improve an integration of an in-cell touch control circuit with an AMOLED driving circuit. The AMOLED pixel circuit comprises a light-emitting module, a touch control module, a control module, and a driving and amplifying module. The MOLED pixel circuit provided in embodiments of the present disclosure can be used in the manufacture of the AMOLED display device.

20 Claims, 4 Drawing Sheets

(52) U.S. Cl.
CPC ... *G09G 2300/08* (2013.01); *G09G 2300/0809* (2013.01); *G09G 2310/0251* (2013.01); *G09G 2310/0291* (2013.01)

(56) References Cited

U.S. PATENT DOCUMENTS

| | | | | |
|---|---|---|---|---|
| 2010/0097350 A1* | 4/2010 | Choi | ............... | G06F 3/042 345/175 |
| 2010/0097354 A1* | 4/2010 | Ahn | ............... | G06F 3/042 345/175 |
| 2010/0117991 A1* | 5/2010 | Koyama | ............... | G02F 1/13338 345/175 |
| 2011/0273397 A1* | 11/2011 | Hanari | ............... | G06F 3/0412 345/174 |
| 2013/0321366 A1* | 12/2013 | Kozuma | ............... | G09G 3/34 345/204 |

FOREIGN PATENT DOCUMENTS

| | | |
|---|---|---|
| CN | 103135846 A | 6/2013 |
| CN | 103295525 A | 9/2013 |
| CN | 103310734 A | 9/2013 |
| CN | 103325341 A | 9/2013 |
| CN | 103325342 A | 9/2013 |
| CN | 103345901 A | 10/2013 |
| CN | 20328821 U | 11/2013 |
| CN | 203288218 U | 11/2013 |
| CN | 203288219 U | 11/2013 |
| CN | 203288220 U | 11/2013 |

OTHER PUBLICATIONS

English translation of First Office Action issued by State Intellectual Property Office of People's Republic of China, in Chinese application No. 201310259983.6, dated Nov. 3, 2014, 4 pages.
English abstract of CN103295525A; 1 page.
Written Opinion of International Searching Authority (English language), for International Application No. PCT/CN2013/084630, issued Apr. 3, 2014, 6pgs.
English abstract of CN101017491A.
English abstract of CN102402931A.
English abstract of CN103135846A.
International Search Report for International Application No. PCT/CN2013/084630 issued Mar. 16, 2014, 14pgs.

* cited by examiner

ACTIVE MATRIX ORGANIC LIGHT-EMITTING DIODE PIXEL CIRCUIT HAVING A TOUCH CONTROL MODULE AND METHOD FOR DRIVING THE SAME

CROSS REFERENCE TO RELATED APPLICATIONS

This application is based on International Application No. PCT/CN2013/084630 filed on Sep. 29, 2013, which claims priority to Chinese National Application No. 201310259983.6 filed on Jun. 26, 2013. The entire contents of each and every foregoing application are incorporated herein by reference.

TECHNICAL FIELD

The present disclosure relates to a field of display technology, particularly to an Active Matrix Organic Light-Emitting Diode (AMOLED) pixel circuit, a method for driving the same, and a display device.

BACKGROUND

With rapid development of the display technology, display devices with a touch control function are gradually popular since they have advantages such as visualization operation. In general, the existing display devices with the touch control function can be classified into display devices with an on-cell touch screen panel and display devices with an in-cell touch screen panel according to the position of the touch screen panel relative to the display panel. Compared to the on-cell touch screen panel, the in-cell touch screen panel is thinner in thickness and has a higher light transmittance.

For existing display devices, the Organic Light Emitting Diode (OLED), as a current type light-emitting element, is increasingly applied to the field of high performance display, since it has characteristics such as self-luminance, rapid response, wide view angle, and capability of being manufactured on a flexible substrate, and the like. OLED display devices can be classified into Passive Matrix Driving OLED display devices and Active Matrix Driving OLED display devices, wherein since an AMOLED display device has advantages such as low cost in production, high response speed, energy-saving, direct-current driving capability available to a portable apparatus, wide operating temperature range, and the like, it tends to replace the Liquid Crystal Display to be as a next generation of a novel flat panel display. Therefore, the AMOLED display panel with the in-cell touch control function has increasingly gained favor with customer.

In an existing AMOLED display panel, each OLED is driven by a driving circuit comprising a plurality of Thin Film Transistors (TFTs) in a pixel unit on an array substrate to emit light so as to realize image display. In the in-cell Touch Screen Panel (TSP), sensors and a driving circuit for touch are manufactured in each pixel unit on the array substrate by the array technical process. If the sensors and the driving circuit for the TSP are incorporated to the AMOLED pixel, a certain number of TFTs for the driving circuit are required to be added, thus occupying a certain extra space in a pixel unit; however the spare space in the pixel unit is limited, which significantly constrains the in-cell touch screen panel circuit and the AMOLED driving circuit from being manufactured simultaneously.

SUMMARY

In embodiments of the present disclosure, there are provided an AMOLED pixel circuit, a method for driving the same, and a display device, which can improve an integration of an in-cell touch control circuit with an AMOLED driving circuit.

In order to achieve the above purpose, the embodiments of the present disclosure utilize the following technical solutions.

In one aspect of the embodiments of the present disclosure, there is provided an AMOLED pixel circuit comprising: a light-emitting module, a touch control module, a control module, and a driving and amplifying module;

the light-emitting module is connected to the control module and a first voltage terminal, and is used for emitting light for display under the control of the control module;

the touch control module is connected to the control module, a second signal line, and is used for receiving a touch control signal as input;

the control module is further connected to a first signal line, the second signal line, a third signal line, and a data line, and is used for controlling the light-emitting module and the touch control module according to signals input from the signal lines; and the driving and amplifying module is connected to the light-emitting module, the touch control module, the control module and a second voltage terminal, and is used for driving the light-emitting module or amplifying the touch control signal received by the touch control module.

Further, the light-emitting module comprises:
a first transistor having a gate connected the control module and a second electrode connected to the driving and amplifying module;
a light-emitting element having one terminal connected to a first electrode of the first transistor and the other terminal connected to the first voltage terminal Further, the control module comprises:
a second transistor having a gate connected to the first signal line, a first electrode connected to the light-emitting element, and a second electrode connected to the driving and amplifying module;
a third transistor having a gate connected to the third signal line, a first electrode connected to the gate of the first transistor, and a second electrode connected to the data line; and
a fourth transistor having a gate connected to the second signal line, a first electrode connected to the driving and amplifying module, and a second electrode connected to the data line.

Further, the driving and amplifying module comprises:
a fifth transistor having a gate connected to the first electrode of the third transistor, a first electrode connected to the second voltage terminal, and a second electrode connected to the first electrode of the fourth transistor;
a sixth transistor having a gate connected to the first electrode of the third transistor, a first electrode connected to the second voltage terminal, and a second electrode connected to the second electrode of the first transistor and the second electrode of the second transistor; and
a storage capacitor having one terminal connected to the first electrode of the third transistor, and the other terminal connected to the second voltage terminal.

Further, the touch control module comprises:
a seventh transistor having a gate connected to the second signal line, and a first electrode connected to the first electrode of the third transistor; and
an optoelectronic diode having an anode connected to the second voltage terminal, and a cathode connected to a second electrode of the seventh transistor.

As an alternative, the touch control module comprises:

a seventh transistor having a gate connected to the second signal line, and a first electrode connected to the first electrode of the third transistor; and a sensing electrode connected to a second electrode of the seventh transistor.

It should be noted that the first, second, third, fourth, fifth and sixth transistors are N-type transistors, and the seventh transistor is a P-type transistor;

as an alternative, the first, second, third, fourth, fifth and sixth transistors are P-type transistors, and the seventh transistor is an N-type transistor.

In another aspect of the present disclosure, there is provided a display device comprising any of the AMOLED pixel circuits as described above.

In still another aspect of the present disclosure, there is provided a method for driving the AMOLED pixel circuit, wherein the method comprises:

switching off the light-emitting module, inputting an initialization signal from the data line, and initializing the touch control module and the driving and amplifying module by the control module according to the initialization signal;

receiving the touch control signal by the touch control module;

switching off the touch control module, and amplifying the touch control signal by the driving and amplifying module and outputting the amplified touch control signal to the data line;

pre-charging the driving and amplifying module via the control module by the data signal input from the data line;

switching on the light-emitting module, and driving the light-emitting module by the driving and amplifying module to emit light for display.

In particular, the method comprises:

an initialization phase, wherein the first transistor is turned off so that the light-emitting element is switched off, and the seventh transistor is turned on so that the touch control module is electrically connected to the gate of the fifth transistor and the gate of the sixth transistor, and the storage capacitor serves as a storage capacitor of the fifth transistor and the sixth transistor; the third transistor is turned on, the data line inputs the initialization signal, and the storage capacitor is pre-charged to a level of the initialization signal;

a touch control phase, wherein the third transistor and the fourth transistor are turned off, the seventh transistor is turned on, and the touch control module receives the touch control signal;

a reading phase, wherein the fourth transistor is turned on, the third and seventh transistors are turned off, so that the touch control module is switched off, and the fifth transistor and the sixth transistor amplify the voltage at the gates of the fifth and sixth transistors and output the amplified voltage to the data line;

a writing phase, wherein the seventh transistor is turned off, the second, third and fourth transistors are turned on, the data line inputs a grayscale current to charge the gate of the fifth transistor, the gate of the sixth transistor and the storage capacitor;

a light-emitting phase, wherein the second, third, and seventh transistors are turned off, the first transistor is turned on, the sixth transistor operates in a linear region, and the second transistor operates in a saturation region, and the light-emitting element is driven to emit light for display.

Further, said receiving the touch control signal by the touch control module comprises:

determining to receive the touch control signal by the touch control module according to quantity of the light received by the optoelectronic diode when a touch control operation is performed; or determining to receive the touch control signal by the touch control module according to a capacitance value of a sensing capacitor formed between a sensing electrode and a touch terminal of the user when the touch control operation is performed.

It should be noted that the first, second, third, fourth, fifth and sixth transistors are N-type transistors, and the seventh transistor is a P-type transistor; or the first, second, third, fourth, fifth and sixth transistors are P-type transistors, and the seventh transistor is an N-type transistor.

In the AMOLED pixel circuit, the method for driving the same and the display device provided in the embodiments of the present disclosure, by integrating the in-cell touch control circuit into the AMOLED pixel circuit, the control module and the driving and amplifying module are shared by the light-emitting module and the touch control module. Thus, the in-cell touch control circuit and the AMOLED pixel circuit can be driven in a time division mode by adjusting the timing sequences of the signals for driving without increasing the number of the signals, so that the integration of the in-cell touch control circuit with the AMOLED driving circuit is improved greatly, and it can be realized that the in-cell touch screen panel circuit and the AMOLED driving circuit are manufactured simultaneously in the limited space of the pixel unit, thus enhancing the quality of the display product significantly and reducing the difficulties in manufacturing the display product.

BRIEF DESCRIPTION OF THE DRAWINGS

In order to more clearly describe the technical solutions of the embodiments of the present disclosure or the prior art, drawings necessary for describing the embodiments of the present disclosure or the prior art are simply introduced as follows. It should be obvious for those skilled in the art that the drawings described as follows only illustrate some embodiments of the present disclosure and other drawings can be obtained according to these drawings without paying any inventive efforts.

DETAILED DESCRIPTION OF THE PREFERRED EMBODIMENTS

To illustrate the technical solutions of embodiments of the present disclosure clearly and fully, hereinafter, detailed descriptions will be given to the embodiments of the present disclosure in connection with the accompanying drawings. Obviously, the embodiments as described are only a part of the embodiments of the present disclosure, and are not all the embodiments of the present disclosure. All the other embodiments which are obtained by those skilled in the art based on the embodiments of the present disclosure without paying any inventive labor fall into the protection scope of the present disclosure.

The transistors employed in all the embodiments of the present disclosure can be thin film transistors, field effect transistors, or any elements with the same characteristics. Since a source and a drain of a transistor utilized herein are symmetrical, there is no distinction between the source and the drain thereof. In the embodiments of the present disclosure, in order to make a distinction between two electrodes of a transistor other than a gate thereof, one of the two electrodes is referred to as a source, and the other is referred to as a drain. Further, a transistor can be classified into an N-type transistor or a P-type transistor based on the characteristics of the transistor; in the embodiments of the present disclosure, when the N-type transistor is employed, the first electrode can be the source, and the second electrode can be the drain, and when the P-type transistor is employed, the first electrode can be the drain, and the second electrode can be the source.

Figure 1:
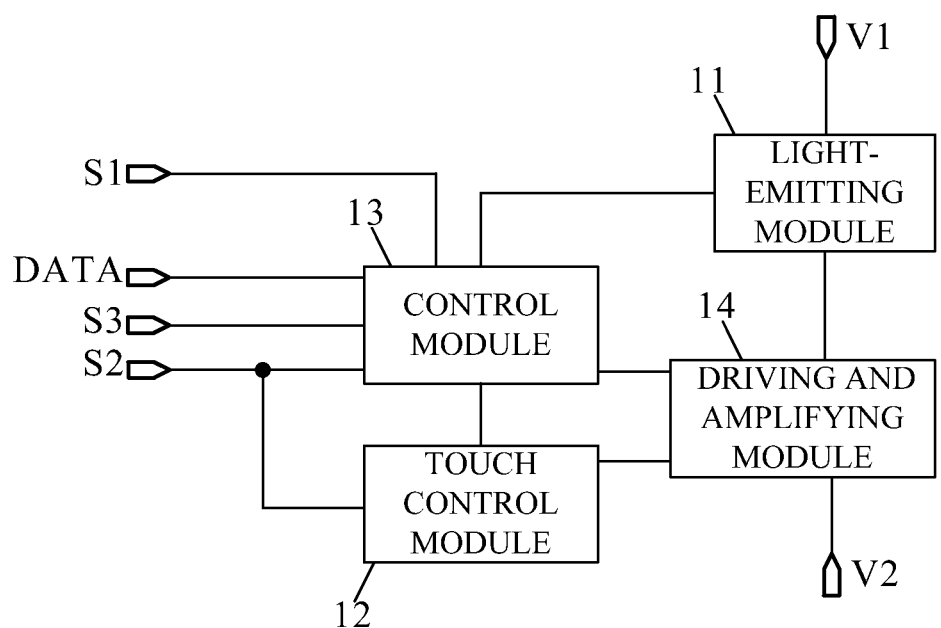
FIG. 1 is a schematic block diagram illustrating a structure of an AMOLED pixel circuit provided in an embodiment of the present disclosure.

FIG. 1 illustrates an AMOLED pixel circuit provided in an embodiment of the present disclosure, wherein the AMOLED pixel circuit comprises: a light-emitting module 11, a touch control module 12, a control module 13, and a driving and amplifying module 14.

The light-emitting module 11 is connected to the control module 13 and a first voltage terminal V1, and is used for emitting light for display under the control of the control module 13.

The touch control module 12 is connected to the control module 13, a second signal line S2_$n$, and is used for receiving a touch control signal as input.

The control module 13 is further connected to a first signal line S1_$n$, the second signal line S2_$n$, a third signal line S3_$n$, and a data line DATA, and is used for controlling the light-emitting module 11 and the touch control module 12 according to signals input from the signal lines.

The driving and amplifying module 14 is connected to the light-emitting module 11, the touch control module 12, the control module 13 and a second voltage terminal V2, and is used for driving the light-emitting module 11 or amplifying the touch control signal received by the touch control module 12.

In FIG. 1, for simple illustration, both the first signal line S1_$n$ and a fourth signal line S1_$n$–1 are illustrated as S1, wherein the signal input from the first signal line is generated by delaying the signal input from the fourth signal line for a predetermined time.

In the AMOLED pixel circuit provided in the embodiment of the present disclosure, by integrating the in-cell touch control circuit into the AMOLED pixel circuit, the control module and the driving and amplifying module are shared by the light-emitting module and the touch control module. Thus, the in-cell touch control circuit and the AMOLED pixel circuit can be driven in a time division mode by adjusting the timing sequences of the signals for driving without increasing the number of the signals, so that the integration of the in-cell touch control circuit with the AMOLED driving circuit is improved greatly, and it can be realized that the in-cell touch screen panel circuit and the AMOLED driving circuit are manufactured simultaneously in the limited space of the pixel unit, thus enhancing the quality of the display product significantly and reducing the difficulties in manufacturing the display product.

Optionally, the first voltage terminal V1 can input a high level VDD, and the second voltage terminal V2 can input a low level VSS. The light-emitting module 11 and the touch control module 12 in the AMOLED pixel circuit share one data line DATA, and the data line DATA is mainly used for inputting a light-emitting control signal to the AMOLED pixel circuit or for reading the touch control signal from the same in a time division mode.

Figure 2:
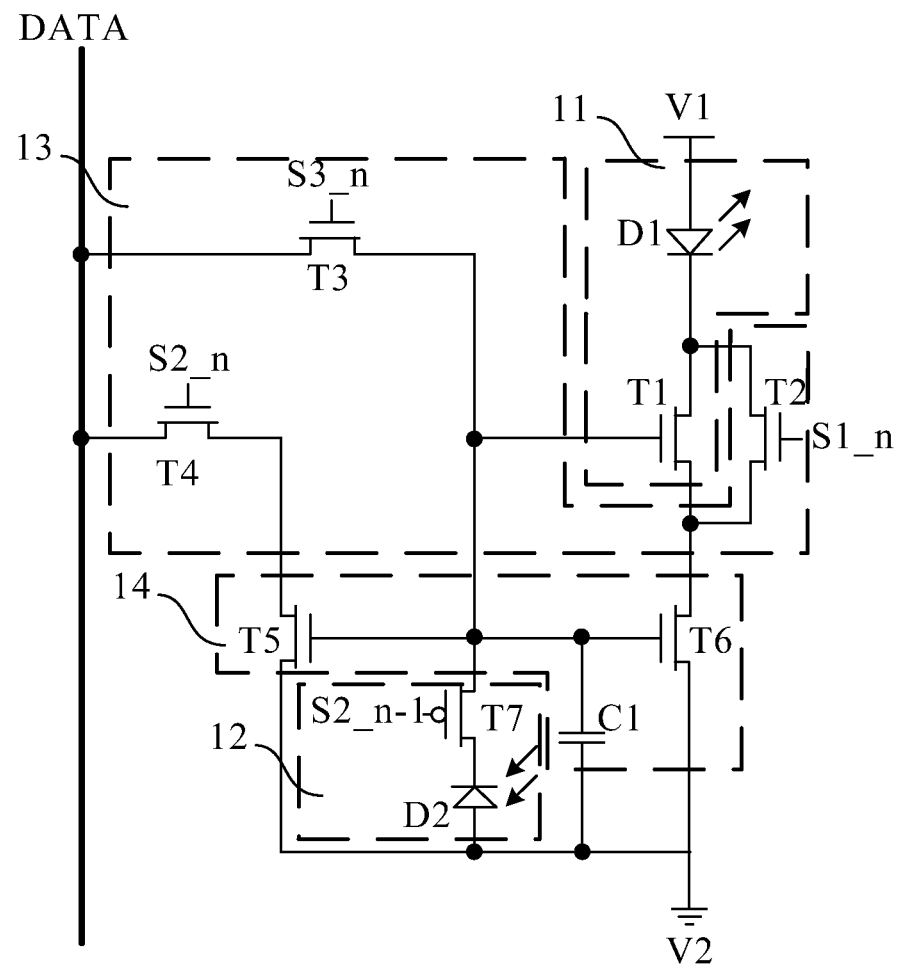
FIG. 2 is a schematic circuit diagram illustrating a structure of an AMOLED pixel circuit provided in an embodiment of the present disclosure.

In particular, as illustrated in FIG. 2, in the AMOLED pixel circuit provided in the embodiment of the present disclosure, the light-emitting module 11 can comprise a first transistor T1 having a gate connected the control module 13 and a second electrode connected to the driving and amplifying module 14; a light-emitting element D1 having one terminal connected to a first electrode of the first transistor T1 and the other terminal connected to the first voltage terminal V1.

In the embodiments of the present disclosure, the light-emitting element D1 can be any one of the current-driven light-emitting elements comprising the Light Emitting Diode (LED), Organic Light Emitting Diode (OLED) and the like in the prior art. In the embodiments of the present disclosure, the OLED is taken as an example to illustrate the principle of the embodiments of the present disclosure.

Further, as shown in FIG. 2, the control module 13 can comprise a second transistor T2, a third transistor T3 and a fourth transistor T4.

The gate of the second transistor T2 is connected to the first signal line S1_$n$, a first electrode of the second transistor T2 is connected to the light-emitting element D1, and a second electrode of the second transistor T2 is connected to the driving and amplifying module 14;

The gate of the third transistor T3 is connected to the third signal line S3_$n$, a first electrode of the third transistor T3 is connected to the gate of the first transistor T1, and a second electrode of the third transistor T3 is connected to the data line DATA; and The gate of the fourth transistor T4 is connected to the second signal line S2_$n$, a first electrode of the fourth transistor T4 is connected to the driving and amplifying module 14, and a second electrode of the fourth transistor T4 is connected to the data line DATA.

In the AMOLED pixel circuit shown in FIG. 2, the driving and amplifying module 14 can comprise a fifth transistor T5, a sixth transistor T6 and a storage capacitor C1.

The gate of the fifth transistor T5 is connected to the first electrode of the third transistor T3, a first electrode of the fifth transistor T5 is connected to the second voltage terminal V2, and a second electrode of the fifth transistor T5 is connected to the first electrode of the fourth transistor T4.

The gate of the sixth transistor T6 is connected to the first electrode of the third transistor T3, a first electrode of the sixth transistor T6 is connected to the second voltage terminal V2, and a second electrode of the sixth transistor T6 is connected to the second electrode of the first transistor T1 and the second electrode of the second transistor T2.

One terminal of the storage capacitor C1 is connected to the first electrode of the third transistor T3, and the other terminal of the storage capacitor C1 is connected to the second voltage terminal V2.

Further, as shown in FIG. 2, the touch control module 12 can comprise a seventh transistor T7 and an optoelectronic diode D2.

The gate of the seventh transistor T7 is connected to the second signal line S2_$n$, and a first electrode of the seventh transistor T7 is connected to the first electrode of the third transistor T3.

The anode of the optoelectronic diode D2 is connected to the second voltage terminal V2, and the cathode of the optoelectronic diode D2 is connected to a second electrode of the seventh transistor T7.

In the touch control module 12 with such a structure, when the user performs a touch control operation, the quantity of the light received by the optoelectronic diode D2 will vary due to the influence of the shading generated by the user in touch, and the optoelectronic diode D2 generates different leakage currents according to the different quantity of the light received. An accurate detection of the touch position can be achieved by observing the leakage currents of the optoelectronic diodes D2 in different pixel areas on the display panel.

Of course, the touch control module 12 in the AMOLED pixel circuit provided in the embodiments of the present disclosure is not limited to a photo-sensitive touch control module, and other types of the known touch control circuit structures can also be applicable to the embodiments of the present disclosure. For example, in the AMOLED pixel circuit shown in FIG. 3, the structure of the touch control module 12 can further comprise a seventh transistor T7 and a sensing electrode D2.

The gate of the seventh transistor T7 is connected to the second signal line S2_$n$, and a first electrode of the seventh transistor T7 is connected to the first electrode of the third transistor T3.

The sensing electrode is connected to a second electrode of the seventh transistor T7.

In the touch control module 12 with such a structure, when the user performs a touch control operation, a sensing capacitor C2 will be formed between a finger of the user or other touch means and the sensing electrode, and an accurate detection of the touch position can also be achieved by detecting the position of the sensing capacitor.

In an actual application, the two touch control modules 12 with the above structures respectively can also be selected or replaced according to actual requirements.

It should be noted that in the AMOLED pixel circuit provided in the embodiments of the present disclosure, the first, second, third, fourth, fifth and sixth transistors T1, T2, T3, T4, T5 and T6 can be N-type transistors, and the seventh transistor T7 can be a P-type transistor. As an alternative, the first, second, third, fourth, fifth and sixth transistors T1, T2, T3, T4, T5 and T6 can be P-type transistors, and the seventh transistor T7 can be an N-type transistor.

In the embodiments of the present disclosure, the case in which the first, second, third, fourth, fifth and sixth transistors T1, T2, T3, T4, T5 and T6 are N-type transistors and the seventh transistor T7 is a P-type transistor is taken as an example for illustration, and it can be appreciated that the same driving effect can also be achieved by changing the levels of the control signals accordingly when the types of the transistors are changed.

In the AMOLED pixel circuit with such a structure provided in the embodiment of the present disclosure, the in-cell touch control circuit and the AMOLED pixel circuit are driven in a time division mode by adjusting the timing sequences of the signals for driving without increasing the number of the signals, so that the integration of the in-cell touch control circuit with the AMOLED driving circuit is improved greatly, and it can be realized that the in-cell touch screen panel circuit and the AMOLED driving circuit are manufactured simultaneously in the limited space of the pixel unit, thus enhancing the quality of the display product significantly and reducing the difficulties in manufacturing the display product.

In the embodiments of the present disclosure, there is further provided a display device comprising an organic light-emitting display, other displays, etc. The display device comprises any one of the AMOLED pixel circuits as described above. The display device can comprise an array comprising a plurality of AMOLED pixel units, wherein each of the plurality of the AMOLED pixel units comprises any one of the AMOLED pixel circuit as described above, which has the same beneficial effects as the pixel circuit provided in the embodiments of the present disclosure. The details are omitted since the detailed descriptions have been given to the above embodiments.

Specifically, the display device provided in the embodiments of the present disclosure can be any display device having the current-driven light-emitting elements comprising the LED display or OLED display.

The display device provided in the embodiments of the present disclosure comprises the AMOLED pixel circuit, wherein by integrating the in-cell touch control circuit into the AMOLED pixel circuit, the control module and the driving and amplifying module are shared by the light-emitting module and the touch control module. Thus, the in-cell touch control circuit and the AMOLED pixel circuit can be driven in a time division mode by adjusting the timing sequences of the signals for driving without increasing the number of the signals, so that the integration of the in-cell touch control circuit with the AMOLED driving circuit is improved greatly, and it can be realized that the in-cell touch screen panel circuit and the AMOLED driving circuit are manufactured simultaneously in the limited space of the pixel unit, thus enhancing the quality of the display product significantly and reducing the difficulties in manufacturing the display product.

A method for driving an AMOLED pixel circuit provided in the embodiments of the present disclosure can be applied to the plurality of AMOLED pixel circuits provided in the above embodiments of the present disclosure, wherein the method comprises:

S101: switching off the light-emitting module, inputting an initialization signal from the data line, and initializing the touch control module and the driving and amplifying module by the control module according to the initialization signal;

S102: receiving the touch control signal by the touch control module;

S103: switching off the touch control module, and amplifying the touch control signal by the driving and amplifying module and outputting the amplified touch control signal to the data line;

S104: pre-charging the driving and amplifying module via the control module by the data signal input from the data line;

S105: switching on the light-emitting module, and driving the light-emitting module by the driving and amplifying module to emit light for display.

In the method for driving the AMOLED pixel circuit provided in the embodiments of the present disclosure, by integrating the in-cell touch control circuit into the AMOLED pixel circuit, the control module and the driving and amplifying module are shared by the light-emitting module and the touch control module. Thus, the in-cell touch control circuit and the AMOLED pixel circuit can be driven in a time division mode by adjusting the timing sequences of the signals for driving without increasing the number of the signals, so that the integration of the in-cell touch control circuit with the AMOLED driving circuit is improved greatly, and it can be realized that the in-cell touch screen panel circuit and the AMOLED driving circuit are manufactured simultaneously in the limited space of the pixel unit, thus enhancing the quality of the display product significantly and reducing the difficulties in manufacturing the display product.

Figure 4:
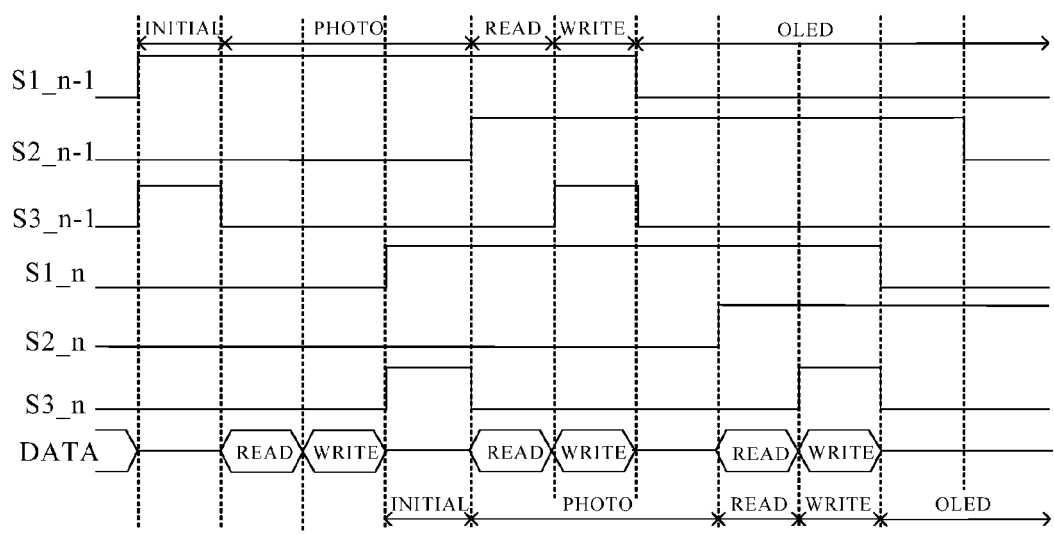
FIG. 4 is a schematic waveform diagram of signals for driving the AMOLED pixel circuit shown in FIG. 2.

Hereinafter detailed descriptions will be given to the method for driving the AMOLED pixel circuit provided in the embodiments of the present disclosure by taking the AMOLED pixel circuit shown in FIG. 2 as an example, wherein waveforms of the timing sequences of respective data signal lines for driving the AMOLED pixel circuit can be as shown in FIG. 4. It should be illustrated that in the embodiments of the present disclosure, the gate of the second transistor T2 is connected to the first signal line S1_$n$; the gate of the fourth transistor T4 is connected to the second signal line S2_$n$, and the gate of the seventh transistor T7 is connected to the second signal line S2_$n$, the waveform of the signal S2_$n$ is obtained by delaying the waveform of the signal S2_$n$−1 for a certain time; the gate of the third transistor T3 is connected to the third signal line S3_$n$, and is input with the signal S3_$n$.

In the AMOLED pixel circuit shown in FIG. 2, a case in which the first, second, third, fourth, fifth and sixth transistors T1, T2, T3, T4, T5 and T6 are N-type transistors and the seventh transistor T7 is a P-type transistor is taken as an example for illustration. It can be conceived that the same driving effect can also be achieved by changing the levels of the control signals accordingly when the types of the above transistors are changed.

In particular, in combination with the waveforms of the timing sequences of the respective data signal lines for driving the AMOLED pixel circuit as shown in FIG. 4, and specifically with reference to respective operational phases marked below the DATA signal line in FIG. 4, i.e., an initialization phase (INITIAL), a touch control phase (PHOTO), a reading phase (READ), a writing phase (WRITE), and a light-emitting phase (OLED), the method for driving the AMOLED pixel circuit provided in the embodiments of the present disclosure can comprise the following phases.

During the initialization phase (INITIAL), the signals S2_$n$ and S2_$n$−1 are at a low level, and the signals S1_$n$ and S3_$n$ are at a high level; at this time, the first transistor T1 is turned off so that the light-emitting element is switched off, and the seventh transistor T7 is turned on so that the touch control module 12 is electrically connected to the gate of the fifth transistor T5 and the gate of the sixth transistor T6, and the storage capacitor C1 serves as a storage capacitor of the fifth transistor T5 and the sixth transistor T6; the third transistor T3 is turned on, and the data line DATA inputs an initialization signal VINI and pre-charges the storage capacitor C1 to a level of the initialization signal VINI.

Thus, the storage capacitor C1 can be pre-charged to the level of the initialization signal VINI when the touch control module 12 is initialized, which can ensure that the fifth transistor T5 operates in a saturation and amplification state during the next phase.

During the touch control phase (PHOTO), the signals S2_$n$ and S3_$n$ are at a low level, and the signals S2_$n$ and S2_$n$−1 are at a high level. At this time, the third transistor T3 and the fourth transistor T4 are turned off, the seventh transistor T7 is turned on, and the touch control module 12 receives a touch control signal.

The structure of the touch control module 12 can be as shown in FIG. 2. The touch control module 12 comprises an optoelectronic diode D2. In the touch control module 12 with such a structure, when the user performs a touch control operation, the quantity of the light received by the optoelectronic diode D2 will vary due to the influence of the shading generated by the user in touch, and the optoelectronic diode D2 generates different leakage currents according to the different quantity of the light received. An accurate detection of the touch position can be achieved by observing the leakage currents of the optoelectronic diodes D2 in different pixel areas on the display panel.

Figure 3:
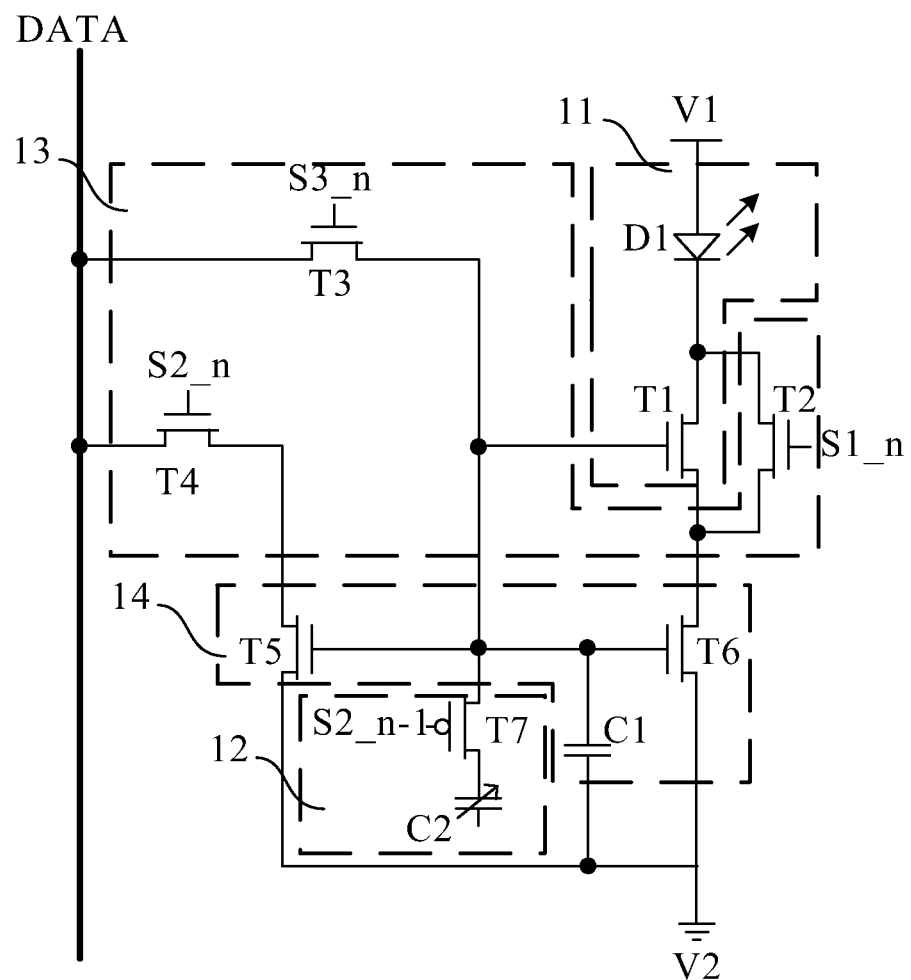
FIG. 3 is a schematic circuit diagram illustrating a structure of another AMOLED pixel circuit provided in an embodiment of the present disclosure.

Of course, the touch control module 12 in the AMOLED pixel circuit provided in the embodiments of the present disclosure is not limited to a photo-sensitive touch control module, and other types of the known touch control circuit structures can also be applicable to the embodiments of the present disclosure. For example, another structure of the touch control module 12 can be as shown in FIG. 3, wherein the touch control module 12 comprises a sensing electrode. In the touch control module 12 with such a structure, when the user performs a touch control operation, a sensing capacitor C2 will be formed between the finger of the user or other touch means and the sensing electrode, and an accurate detection of the touch position can also be achieved by detecting the position of the sensing capacitor.

In the actual application, the two touch control modules 12 with the above structures respectively can also be selected or replaced according to the actual requirements.

In particular, the detailed descriptions will be given to the touch control phase by taking the photo-sensitive touch control module as an example. When the third transistor T3 and the fourth transistor T4 are turned off, the optoelectronic diode D2 detects a touch state of the display panel; when the touch screen panel is touched by the finger of the user, the optoelectronic diode D2 can not be irradiated by an external light source, and the quantity of the light received by the D2 is relative small, and the leakage current generated by the sensed light is small, and the variation of the voltage level of the storage capacitor C1 during the PHOTO phase due to the leakage current is small; when the display panel is not touched, the optoelectronic diode D2 can be irradiated by the external light source, and the quantity of the light received by the D2 is large, and a large leakage current is generated by the sensed light, and then the variation of the voltage level of the storage capacitor C1 during the PHOTO phase due to the leakage current is large. Therefore, if the touch screen panel is touched, the variation of the voltage at the gate of the amplifying transistor T6 relative to an initial voltage is small; and if the touch screen panel is not touched, the variation of the voltage at the gate of the amplifying transistor T6 relative to the initial voltage is large.

During the reading phase (READ), the signal S3_$n$ is at a low level, and the signals S2_$n$−1, S1_$n$ and S2_$n$ are at a high level. At this time, the fourth transistor T4 is turned on, and the third transistor T3 and the seventh transistor T7 are turned off, so that the touch control module 12 is switched off; the fifth and sixth transistors T5, T6 amplify the voltage at the gates thereof and output the amplified voltage to the data line DATA.

Thus, the data line DATA functions as a line for reading the output voltage as the result of the touch at this time, and the fifth and sixth transistors T5, T6 amplify the voltage at the gates thereof and output the amplified voltage to the data line DATA, so that the result of the touch is output to a touch control signal reading circuit arranged in the periphery of the display panel.

The above three phases show the operational procedure of the touch control function circuit, wherein the touch control function is realized by detecting and reading the touch control signal.

During the writing phase (WRITE), the signals S2_$n$−1, S1_$n$, S2_$n$ and S3_$n$ are at a high level. At this time, the seventh transistor T7 is turned off, the second, third and fourth transistors T2, T3 and T4 are turned on, the data line DATA inputs a grayscale current to charge the gates of the fifth and sixth transistors T5, T6 and the storage capacitor C1.

Since the AMOLED is a current-driven element, the data line DATA inputs a grayscale current $I_{DATA}$, the gate and the drain of the fifth transistor T5 are connected, and the gate and the drain of the sixth transistor T6 are connected, the fifth and sixth transistors T5, T6 are in a saturation state. $I_{DATA}=I_{DS1}+I_{DS2}$, where $I_{DS1}$ represents the saturation drain current of the fifth transistor T5, $I_{DS2}$ represents the saturation drain current of the sixth transistor T6, $I_{DATA}$ represents the current for charging a pixel and is input from the peripheral driving circuit for charging the storage capacitor C1.

$$I_{DATA}=I_{DS1}$$

Since the gate of the fifth transistor T5 is connected to the gate of the fifth transistor T6, and the sixth transistor T6 is in the saturation state, so $I_{DS2}=\frac{1}{2}k_2(V_{GS}-V_{TH})^2$;
Thus, $$I_{DS1} = \frac{1}{2}k_1(V_{GS}-V_{TH})^2 = \frac{1}{2}k_2(V_{GS}-V_{TH})^2 \frac{k_1}{k_2} = \frac{k_1}{k_2}I_{DS2},$$

that is, $$I_{DATA} = \frac{k_1}{k_2}I_{DS2}$$

During the light-emitting phase (OLED), the signals $S1\_n$ and $S3\_n$ are at a low level, and the signals $S2\_n-1$ and $S2\_n$ are at a high level. At this time, the second, third and seventh transistors T2, T3 and T7 are turned off, the first transistor T1 is turned on, the sixth transistor T6 operates in a linear region, the second transistor T2 operates in a saturation region, and the light-emitting element D1 is driven to emit light for display.

In particular, the drain current of the sixth transistor T6 is represented by $I_{DS2}'=k_2((V_{GS}-V_{TH})\cdot V_{DS2}-\frac{1}{2}V_{DS2}^2)$,
and the drain current of the first transistor T1 is represented by $I_{DS5}'=\frac{1}{2}k_5(V_{GS5}-V_{TH})^2$, $$I_{DS5}'=\frac{1}{2}k_5(V_{GS5}-V_{TH})^2=\frac{1}{2}k_5[(V_{GS}-V_{TH})^2-2V_{DS2}(V_{GS}-V_{TH})+V_{DS2}^2]$$

$$=\frac{1}{2}k_5\cdot(V_{GS}-V_{TH})^2-k_5\cdot V_{DS2}(V_{GS}-V_{TH})+\frac{1}{2}k_5\cdot V_{DS2}^2$$

$$I_{DS2}'=k_2((V_{GS}-V_{TH})\cdot V_{DS2}--\frac{1}{2}V_{DS2}^2).$$

Since $$I_{DS2}' = I_{DS5}' = I_{OLED},$$

$$\frac{1}{2}k_5\cdot(V_{GS}-V_{TH})^2 - k_5\cdot V_{DS2}(V_{GS}-V_{TH}) + \frac{1}{2}k_5\cdot V_{DS2}^2 = k_2\cdot(V_{GS}-V_{TH})\cdot V_{DS2} - \frac{1}{2}k_2\cdot V_{DS2}^2$$

$$=> \frac{k_5}{k_2}\cdot I_{DS2} - (k_2+k_5)\cdot V_{DS2}(V_{GS}-V_{TH}) + \frac{1}{2}(k_2+k_5)\cdot V_{DS2}^2 = 0$$

$$=> \frac{k_5}{k_2}\cdot I_{DS2} - (k_2+k_5)\cdot\left(V_{DS2}\cdot(V_{GS}-V_{TH})-\frac{1}{2}V_{DS2}^2\right) = 0$$

$$=> \frac{k_5}{k_2}\cdot I_{DS2} - k_2\left(1+\frac{k_5}{k_2}\right)\cdot\left(V_{DS2}\cdot(V_{GS}-V_{TH})-\frac{1}{2}V_{DS2}^2\right) = 0$$

$$=> \frac{k_5}{k_2}\cdot I_{DS2} = \frac{k_2+k_5}{k_2}\cdot I_{DS2}' \quad => I_{DS2} = \frac{k_2+k_5}{k_5}\cdot I_{DS2}'$$

As $I_{OLED}=I_{DS2}'$, $$I_{DS2} = \frac{k_2+k_5}{k_5}\cdot I_{DS2}',$$

as described above, $$I_{DATA} = \frac{k_1}{k_2}I_{DS2},$$

and thus, $$I_{DATA} = \frac{k_2+k_5}{k_5}\cdot\frac{k_1}{k_2}I_{OLED}.$$

$I_{OLED}$ is in a direct proportion to $I_{DATA}$, and the values of k1, k2 and k5 can be selected so that there is a relatively large scale between $I_{DATA}$ and $I_{OLED}$.

Since there is a relatively large scale $$\frac{k_1}{k_2}\cdot\frac{k_2+k_5}{k_5}$$

between the charging current $I_{DATA}$ and the driving current $I_{OLED}$, it can be achieved that there is a relatively large charging current $I_{DATA}$ while ensuring that the $I_{OLED}$ is in the range of the operating current of the OLED, so that the charging for the storage capacitor $C_1$ is expedited and the light-emitting element D1 can emit light until a next frame.

It should be noted that the above descriptions are given to the method for driving the AMOLED pixel circuit provided in the embodiments of the present disclosure by taking the AMOLED pixel circuit shown in FIG. 2 as an example. The method for driving the AMOLED pixel circuit provided in the embodiments of the present disclosure can also be applicable to the AMOLED pixel circuit shown in FIG. 3, wherein the specific procedures can be referred to the above embodiments, and the details are omitted.

In the method for driving the AMOLED pixel circuit with such a structure provided in the embodiments of the present disclosure, the in-cell touch control circuit and the AMOLED pixel circuit can be driven in a time division manner by adjusting the timing sequences of the signals for driving without increasing the number of the signals, so that the integration of the in-cell touch control circuit with the AMOLED driving circuit is improved greatly, and it can be realized that the in-cell touch screen panel circuit and the AMOLED driving circuit are manufactured simultaneously in the limited space of the pixel unit, thus enhancing the quality of the display product significantly and reducing the difficulties in manufacturing the display product.

It is appreciated for those skilled in the art that all or some of the steps in the method provided in the above embodiments can be implemented by the hardware related to the program instructions, and the program can be stored in the computer readable storage medium, and the steps of the method provided in the embodiments can be carried out when the program is executed; the aforementioned storage medium comprises ROM, RAM, the magnetic disk, optical disk, and any medium capable of storing the program codes.

It should be appreciated that the above embodiments are only for illustrating the principle of the present disclosure, and in no way limit the scope of the present disclosure. It will be obvious that those skilled in the art may make modifications, variations and equivalences to the above embodiments without departing from the spirit and scope of the present disclosure as defined by the following claims. Such variations and modifications are intended to be included within the spirit and scope of the present disclosure.

What is claimed is:

1. An active matrix organic light-emitting diode (AMOLED) pixel circuit, characterized by comprising a light-emitting module, a touch control module, a control module, and a driving and amplifying module; wherein
the light-emitting module is connected to the control module and a first voltage terminal, and is used for emitting light for display under the control of the control module;
the touch control module is connected to the control module and a second signal line, and is used for receiving a touch control signal as input;
the control module comprises a third transistor having a gate connected to a third signal line, a first electrode connected to the light-emitting module and the touch control module, and a second electrode connected to the data line; and a fourth transistor having a gate connected to the second signal line, a first electrode connected to the driving and amplifying module, and a second electrode connected to the data line, and the control module is used for controlling the light-emitting module and the touch control module according to signals input from the signal lines; and
the driving and amplifying module is connected to the light-emitting module, the touch control module, the control module and a second voltage terminal, and is used for driving the light-emitting module or amplifying the touch control signal received by the touch control module, the driving and amplifying module comprises a storage capacitor, one terminal of the storage capacitor is connected to the first electrode of the third transistor and one terminal of the touch control module, and the other terminal of the storage capacitor is connected to the second voltage terminal.

2. The AMOLED pixel circuit of claim 1, characterized in that the light-emitting module comprises:
a first transistor having a gate connected to the first electrode of the third transistor in the control module and a second electrode connected to the driving and amplifying module; and
a light-emitting element having one terminal connected to a first electrode of the first transistor and the other terminal connected to the first voltage terminal.

3. The AMOLED pixel circuit of claim 2, characterized in that the control module further comprises:
a second transistor having a gate connected to the first signal line, a first electrode connected to the light-emitting element, and a second electrode connected to the driving and amplifying module.

4. The AMOLED pixel circuit of claim 3, characterized in that the driving and amplifying module further comprises:
a fifth transistor having a gate connected to the first electrode of the third transistor, a first electrode connected to the second voltage terminal, and a second electrode connected to the first electrode of the fourth transistor;
a sixth transistor having a gate connected to the first electrode of the third transistor, a first electrode connected to the second voltage terminal, and a second electrode connected to the second electrode of the first transistor and the second electrode of the second transistor.

5. The AMOLED pixel circuit of claim 4, characterized in that the touch control module comprises:
a seventh transistor having a gate connected to the second signal line, and a first electrode connected to the first electrode of the third transistor; and
an optoelectronic diode having an anode connected to the second voltage terminal, and a cathode connected to a second electrode of the seventh transistor.

6. The AMOLED pixel circuit of claim 5, characterized in that the first, second, third, fourth, fifth and sixth transistors are N-type transistors, and the seventh transistor is a P-type transistor; or
the first, second, third, fourth, fifth and sixth transistors are P-type transistors, and the seventh transistor is an N-type transistor.

7. A method for driving the AMOLED pixel circuit of claim 5, comprising:
switching off the light-emitting module, inputting an initialization signal from the data line, and initializing the touch control module and the driving and amplifying module by the control module according to the initialization signal;
receiving the touch control signal by the touch control module;
switching off the touch control module, and amplifying the touch control signal by the driving and amplifying module and outputting the amplified touch control signal to the data line;
pre-charging the driving and amplifying module via the control module by the data signal input from the data line; and
switching on the light-emitting module, and driving the light-emitting module by the driving and amplifying module to emit light for display
wherein the method further comprises:
an initialization phase, wherein the first transistor is turned off so that the light-emitting element is switched off, and the seventh transistor is turned on so that the touch control module is electrically connected to the gate of the fifth transistor and the gate of the sixth transistor, and the storage capacitor serves as a storage capacitor of the fifth transistor and the sixth transistor; the third transistor is turned on, the data line inputs an initialization signal, and the storage capacitor is pre-charged to a level of the initialization signal;
a touch control phase, wherein the third transistor and the fourth transistor are turned off, the seventh transistor is turned on, and the touch control module receives the touch control signal;
a reading phase, wherein the fourth transistor is turned on, the third and seventh transistors are turned off, so that the touch control module is switched off, and the fifth transistor and the sixth transistor amplify the voltage at the gates of the fifth and sixth transistors and output the amplified voltage to the data line;
a writing phase, wherein the seventh transistor is turned off, the second, third and fourth transistors are turned on, the data line inputs a grayscale current to charge the gate of the fifth transistor, the gate of the sixth transistor and the storage capacitor; and
a light-emitting phase, wherein the second, third, and seventh transistors are turned off, the first transistor is turned on, the sixth transistor operates in a linear region, and the second transistor operates in a saturation region, and the light-emitting element is driven to emit light for display.

8. The method of claim 7, characterized in that the first, second, third, fourth, fifth and sixth transistors are N-type transistors, and the seventh transistor is a P-type transistor; or
the first, second, third, fourth, fifth and sixth transistors are P-type transistors, and the seventh transistor is an N-type transistor.

9. The AMOLED pixel circuit of claim 4, characterized in that the touch control module comprises:
a seventh transistor having a gate connected to the second signal line, and a first electrode connected to the first electrode of the third transistor; and
a sensing electrode connected to a second electrode of the seventh transistor.

10. The AMOLED pixel circuit of claim 9, characterized in that the first, second, third, fourth, fifth and sixth transistors are N-type transistors, and the seventh transistor is a P-type transistor; or
the first, second, third, fourth, fifth and sixth transistors are P-type transistors, and the seventh transistor is an N-type transistor.

11. A method driving the AMOLED pixel circuit of claim 9, comprising:
switching off the light-emitting module, inputting an initialization signal from the data line, and initializing the touch control module and the driving and amplifying module by the control module according to the initialization signal;
receiving the touch control signal by the touch control module;
switching off the touch control module, and amplifying the touch control signal by the driving and amplifying module and outputting the amplified touch control signal to the data line;
pre-charging the driving and amplifying module via the control module by the data signal input from the data line; and
switching on the light-emitting module, and driving the light-emitting module by the driving and amplifying module to emit light for display
wherein the method further comprises:
an initialization phase, wherein the first transistor is turned off so that the light-emitting element is switched off, and the seventh transistor is turned on so that the touch control module is electrically connected to the gate of the fifth transistor and the gate of the sixth transistor, and the storage capacitor serves as a storage capacitor of the fifth transistor and the sixth transistor; the third transistor is turned on, the data line inputs an initialization signal, and the storage capacitor is pre-charged to a level of the initialization signal;
a touch control phase, wherein the third transistor and the fourth transistor are turned off, the seventh transistor is turned on, and the touch control module receives the touch control signal;
a reading phase, wherein the fourth transistor is turned on, the third and seventh transistors are turned off, so that the touch control module is switched off, and the fifth transistor and the sixth transistor amplify the voltage at the gates of the fifth and sixth transistors and output the amplified voltage to the data line;
a writing phase, wherein the seventh transistor is turned off, the second, third and fourth transistors are turned on, the data line inputs a grayscale current to charge the gate of the fifth transistor, the gate of the sixth transistor and the storage capacitor; and
a light-emitting phase, wherein the second, third, and seventh transistors are turned off, the first transistor is turned on, the sixth transistor operates in a linear region, and the second transistor operates in a saturation region, and the light-emitting element is driven to emit light for display.

12. The method of claim 11, characterized in that the first, second, third, fourth, fifth and sixth transistors are N-type transistors, and the seventh transistor is a P-type transistor; or
the first, second, third, fourth, fifth and sixth transistors are P-type transistors, and the seventh transistor is an N-type transistor.

13. A display device, comprising the AMOLED pixel circuit of claim 1.

14. The display device of claim 13, characterized in that the light-emitting module comprises:
a first transistor having a gate connected the control module and a second electrode connected to the driving and amplifying module; and
a light-emitting element having one terminal connected to a first electrode of the first transistor and the other terminal connected to the first voltage terminal.

15. The display device of claim 14, characterized in that the control module comprises:
a second transistor having a gate connected to the first signal line, a first electrode connected to the light-emitting element, and a second electrode connected to the driving and amplifying module;
a third transistor having a gate connected to the third signal line, a first electrode connected to the gate of the first transistor, and a second electrode connected to the data line; and
a fourth transistor having a gate connected to the second signal line, a first electrode connected to the driving and amplifying module, and a second electrode connected to the data line.

16. The display device of claim 15, characterized in that the driving and amplifying module comprises:
a fifth transistor having a gate connected to the first electrode of the third transistor, a first electrode connected to the second voltage terminal, and a second electrode connected to the first electrode of the fourth transistor;
a sixth transistor having a gate connected to the first electrode of the third transistor, a first electrode connected to the second voltage terminal, and a second electrode connected to the second electrode of the first transistor and the second electrode of the second transistor; and
a storage capacitor having one terminal connected to the first electrode of the third transistor, and the other terminal connected to the second voltage terminal.

17. The display device of claim 16, characterized in that
the touch control module comprises: a seventh transistor having a gate connected to the second signal line, and a first electrode connected to the first electrode of the third transistor; and an optoelectronic diode having an anode connected to the second voltage terminal, and a cathode connected to a second electrode of the seventh transistor; or
the touch control module comprises: a seventh transistor having a gate connected to the second signal line, and a first electrode connected to the first electrode of the third transistor; and
a sensing electrode connected to a second electrode of the seventh transistor.

18. The display device of claim 17, characterized in that the first, second, third, fourth, fifth and sixth transistors are N-type transistors, and the seventh transistor is a P-type transistor; or the first, second, third, fourth, fifth and sixth transistors are P-type transistors, and the seventh transistor is an N-type transistor.

19. A method for driving the AMOLED pixel circuit of claim 1, comprising:

switching off the light-emitting module, inputting an initialization signal from the data line, and initializing the touch control module and the driving and amplifying module by the control module according to the initialization signal;

receiving the touch control signal by the touch control module;

switching off the touch control module, and amplifying the touch control signal by the driving and amplifying module and outputting the amplified touch control signal to the data line;

pre-charging the driving and amplifying module via the control module by the data signal input from the data line; and switching on the light-emitting module, and driving the light-emitting module by the driving and amplifying module to emit light for display.

20. The method of claim 19, characterized in that said receiving the touch control signal by the touch control module comprises:

determining to receive the touch control signal by the touch control module according to quantity of the light received by the optoelectronic diode when a touch control operation is performed; or determining to receive the touch control signal by the touch control module according to a capacitance value of a sensing capacitor formed between a sensing electrode and a touch terminal of the user when the touch control operation is performed.

* * * * *